United States Patent
Engberg et al.

(10) Patent No.: US 9,292,563 B1
(45) Date of Patent: Mar. 22, 2016

(54) CROSS-APPLICATION DATA SHARING WITH SELECTIVE EDITING RESTRICTIONS

(71) Applicant: Evernote Corporation, Redwood City, CA (US)

(72) Inventors: David Engberg, San Francisco, CA (US); Seth Hitchings, San Francisco, CA (US); Phil Constantinou, San Francisco, CA (US); Edward Roskos, Sunnyvale, CA (US)

(73) Assignee: Evernote Corporation, Redwood City, CA (US)

( * ) Notice: Subject to any disclaimer, the term of this patent is extended or adjusted under 35 U.S.C. 154(b) by 348 days.

(21) Appl. No.: 13/930,038

(22) Filed: Jun. 28, 2013

Related U.S. Application Data

(60) Provisional application No. 61/704,912, filed on Sep. 24, 2012.

(51) Int. Cl.
   *G06F 17/30* (2006.01)
(52) U.S. Cl.
   CPC .............................. *G06F 17/30371* (2013.01)
(58) Field of Classification Search
   CPC ............................................... G06F 17/30371
   USPC ........................................................ 707/608
   See application file for complete search history.

(56) References Cited

U.S. PATENT DOCUMENTS

| | | | |
|---|---|---|---|
| 7,191,392 B1 * | 3/2007 | Coar ................. | G06F 17/30011 235/462.07 |
| 7,945,615 B1 * | 5/2011 | Shetty et al. .................. | 709/203 |
| 8,341,554 B1 * | 12/2012 | Benson et al. ................. | 715/837 |
| 2003/0056174 A1 * | 3/2003 | Nara ..................... | G06F 17/217 715/255 |
| 2004/0025052 A1 * | 2/2004 | Dickenson .............. | G06F 21/78 726/4 |
| 2004/0030591 A1 * | 2/2004 | Graham ........................... | 705/8 |
| 2005/0243372 A1 * | 11/2005 | Sato ...................... | G06F 3/1205 358/1.18 |
| 2007/0185869 A1 * | 8/2007 | Kirnak .............................. | 707/6 |
| 2008/0037789 A1 * | 2/2008 | Motohashi .......... | G06F 21/6227 380/277 |
| 2008/0114903 A1 * | 5/2008 | Tadokoro ................. | G06F 21/33 710/8 |
| 2008/0301588 A1 * | 12/2008 | Kumar et al. .................. | 715/841 |
| 2009/0044199 A1 * | 2/2009 | Wei et al. ....................... | 719/313 |
| 2011/0126263 A1 * | 5/2011 | Tadokoro et al. ................. | 726/3 |
| 2011/0225506 A1 * | 9/2011 | Casalaina et al. ............. | 715/741 |
| 2012/0210232 A1 * | 8/2012 | Wang et al. .................... | 715/723 |
| 2013/0174031 A1 | 7/2013 | Constantinou | |
| 2013/0212463 A1 | 8/2013 | Pachikov et al. | |
| 2013/0318063 A1 | 11/2013 | Ayzenshtat et al. | |
| 2014/0032554 A1 | 1/2014 | Constantinou et al. | |

* cited by examiner

*Primary Examiner* — Noosha Arjomandi
(74) *Attorney, Agent, or Firm* — Muirhead and Saturnelli, LLC

(57) ABSTRACT

Sharing data between applications includes a first application converting data from a first format useable by the first application to a second format useable by a second application and the first application providing editing restrictions to restrict the second application from editing at least some of the data in the second format. At least some of the editing restrictions may prohibit editing at least some of the data by the second application. The user may receive a notification in connection with attempting to edit at least some of the data indicating that editing is prohibited. At least some of the restrictions may provide a warning to a user of the second application. The user may choose to edit the restricted data after receiving the warning.

28 Claims, 10 Drawing Sheets

CROSS-APPLICATION DATA SHARING WITH SELECTIVE EDITING RESTRICTIONS

CROSS-REFERENCE TO RELATED APPLICATIONS

This application claims priority to U.S. Prov. App. No. 61/704,912, filed Sep. 24, 2012, and entitled "METHOD AND PROCESS FOR CROSS-APPLICATION DATA SHARING WITH SELECTIVE EDITING RESTRICTIONS," which is incorporated herein by reference.

TECHNICAL FIELD

This application relates to the fields of creation, transmission, editing and presentation of personal and shared information.

BACKGROUND OF THE INVENTION

In 2012, public cloud services generated over $40 B in revenue, expected to grow to $100 B annual revenue by 2016. Modern cloud services provide data accessibility from multiple desktop and mobile platforms and devices and integration with other applications and services. Many popular cloud services are positioned as cloud platforms. Thus, Dropbox and Box OneCloud offer developer tools and APIs for integrating third party applications and services with consumer and enterprise grade cloud storage platforms; the Evernote API and its Trunk marketplace are parts of a universal memory platform, which counted, as of June, 2013, over 450 published third party integrations, around 2,000 applications in production and over 20,000 active developers. In addition to integrations with their own platforms, new cloud services are increasingly offering interoperability with products from established players, including prominent social networking sites such as Facebook, Twitter and Tumblr, to name a few. The ecosystem of interconnected cloud services and associated desktop and mobile application spaces on different software platforms (Mac, Windows, iOS, Android, etc.) integrated with those services is becoming increasingly complex; it requires efficient development and maintenance.

Users receive maximal benefit from cloud services when data exchange between various software components of a cloud platform is as seamless and transparent as possible. This requirement creates a series of challenging and multifaceted tasks due to the broad range of supported data formats and their creation, rendering and editing needs. This is especially true for cloud services that may have their own rich and editable standard, or main data formats shared between service's core client software applications. Normally, a cloud service's native data format is consistently rendered on each software platform where such client software is offered. New data may arrive from the service's own client applications after they are created by users according to their needs, in which case the data automatically comply with service's core rendering and editing guidelines. However, new user data may also arrive from external sources; for example, user data may be created in additional software applications that do not belong to the core suite of cloud service's client applications. Such external applications may be developed by the service vendor or by third parties and interoperate with the service via existing integration methods. Incorporation of such external data assumes either their conversion to service's standard format or encapsulation of such data as attachments that require special non-standard-client applications to render and/or edit the data. When the data is distributed across the service and is accessible by diverse applications, data editing may also occur at different levels and the data should remain unbroken and accessible across the service and its software space.

There is a broad range of partial authoring and rendering options available for a particular external data object created outside of the cloud service's standard client set. On the near side of the spectrum is application data created in a service-friendly format. For example, a portion of HTML content of a simple web page delivered to the Evernote service via its web clipper application may be easily converted into the service's standard format and thus becomes both viewable and editable in place, that is, by the service's own client software. On the far side of the range are complex multi-component data in binary, XML or other textual or combined formats, created in specialized applications (such as advanced mind-mapping, video editing, CAD, presentation or other industrial software). Sometimes, these types of data may be converted into a cloud service's main format with a simplified presentation layer for rendering, say, in HTML. However, such simplified conversions may deny full or even partial editing and may require keeping editable data files as attachments for opening them in the original authoring applications or in other software that is aware of the full data format. In the middle of the spectrum are authoring software applications which, similarly to Evernote Food or Evernote Hello software, create data compatible with a cloud service's main data format. Such data can be fully rendered and partially edited in service's client applications; however, full editing in the basic client software is risky, because it may break unique data layouts, formats and dependencies specific for the custom applications (for example, the sequence, size and disposition of fields in a contact form) and damage data consistency when the data is re-accessed by the original application after it was edited in the client software.

Accordingly, it is desirable to develop adequate methods and processes for cross-application data sharing and editing within a cloud platform or as part of other multi-application systems.

SUMMARY OF THE INVENTION

According to the system described herein, sharing data between applications includes a first application converting data from a first format useable by the first application to a second format useable by a second application and the first application providing editing restrictions to restrict the second application from editing at least some of the data in the second format. At least some of the editing restrictions may prohibit editing at least some of the data by the second application. The user may receive a notification in connection with attempting to edit at least some of the data indicating that editing is prohibited. At least some of the restrictions may provide a warning to a user of the second application. The user may choose to edit the restricted data after receiving the warning. At least one of the restrictions may indicate a special format of data that is editable by applications that understand the format. The editing restrictions may be provided as markup text in the data. The markup text may be provided as tags in the data and a first tag may indicate a beginning of a particular restricted portion of the data and a second tag may indicate an end of the particular restricted portion. The tags may have parameters indicating restriction strength, an identifier of an original application, an identifier of an intermediate application, an identifier of a target application, and/or an identifier of the restriction within a data set. The markup text may be nested. Sharing data between applications may also include the second application converting data from the second format to a third format useable by a third application and the second application providing editing restrictions to restrict the third application from editing at least some of the data in the third format. The third application may be restricted from editing data based on restrictions provided by the first application. The second application may be a cloud data service that provides accessibility and restricted editing of the data to clients that connect to the cloud service. Data at the cloud service may be edited by at least one of the clients. Edited data may be provided by the second application back to the first application. In connection with providing the data back to the first application, the data may be converted back to the first format and the editing restrictions may be removed. Edited data may be provided by the third application back to the first application and/or the second application. In connection with providing the data back to the first application, the data may be converted back to the first format and the editing restrictions provided by the first application may be removed and wherein, in connection with providing the data back to the second application, the data may be converted back to the second format and the editing restrictions provided by the second application may be removed.

According further to the system described herein, computer software, provided in a non-transitory computer-readable medium, shares data between applications. The software includes executable code that converts data from a first format useable by a first application to a second format useable by a second application and executable code that provides editing restrictions to restrict the second application from editing at least some of the data in the second format. At least some of the editing restrictions may prohibit editing at least some of the data by the second application. The user may receive a notification in connection with attempting to edit at least some of the data indicating that editing is prohibited. At least some of the restrictions may provide a warning to a user of the second application. The user may choose to edit the restricted data after receiving the warning. At least one of the restrictions may indicate a special format of data that is editable by applications that understand the format. The editing restrictions may be provided as markup text in the data. The markup text may be provided as tags in the data and a first tag may indicate a beginning of a particular restricted portion of the data and a second tag may indicate an end of the particular restricted portion. The tags may have parameters indicating restriction strength, an identifier of an original application, an identifier of an intermediate application, an identifier of a target application, and/or an identifier of the restriction within a data set. The markup text may be nested. The software may also include executable code that converts data from the second format to a third format useable by a third application and executable code that provides editing restrictions to restrict the third application from editing at least some of the data in the third format. The third application may be restricted from editing data based on restrictions provided by the first application. The second application may be a cloud data service that provides accessibility and restricted editing of the data to clients that connect to the cloud service. Data at the cloud service may be edited by at least one of the clients. Edited data may be provided by the second application back to the first application. In connection with providing the data back to the first application, the data may be converted back to the first format and the editing restrictions are removed. Edited data may be provided by the third application back to the first application and/or the second application. In connection with providing the data back to the first application, the data may be converted back to the first format and the editing restrictions provided by the first application may be removed and where, in connection with providing the data back to the second application, the data may be converted back to the second format and the editing restrictions provided by the second application may be removed.

According further to the system described herein, selective editing restrictions and permissions are applied to data generated by authoring applications and integrated into a cloud platform. The restrictions and permissions may pertain to a cloud platform's own client software applications that receive data generated by authoring applications and converted into the cloud platform's main standard format. The restrictions may also pertain to other software applications integrated with the cloud platform and therefore receiving standard data of the cloud platform, including converted data generated by other applications. Restrictions and permissions may be presented in the form of special instructions, added to application data in structured text-based formats, such as XML or XHTML, by the original authoring applications at the execution time or/and by developers of those applications at the design phase, as explained elsewhere herein.

Application data sets (files, streams, etc.) originated by authoring applications and subsequently integrated with a cloud platform or with other application platforms may be converted into the platform's own data format prior to submitting the data to the platform. This offers increased data usability, since specialized data formats become available to every platform user for viewing and possibly for partial editing. During such conversion, fragments of the application data may be designated as restricted pieces where editing by certain or all other applications is discouraged; outside of restricted fragments, editing may be silently permitted following the common principle that everything which is not forbidden is allowed. In general, the purpose of editing restrictions may be notifying rather than prohibitive. The restriction/permission structure may be nested, so that, for example, additional pieces of data permitted for editing may be designated by the original authoring application within other restricted fragments.

Editing restrictions may pertain to particular elements in the application data, such as field names in a form or a set of images rendered in a particular order in visualization software, as opposed to field content and generic images. Additionally, a structured content class, such as a recipe in Evernote Food, contact information in Evernote Hello or a mind map in the MindJet MindManager software, may be marked as a restricted data set as a warning to other applications. Only third party developers with a sufficient knowledge of the restricted content should allow editing restricted data by their applications.

According to a particular scenario, editing restrictions may be imposed by authoring applications at the time when the specialized data formats are converted into a platform standard main format used by a cloud service and by client software of the cloud service on a variety of devices running different operating systems. If such conversion is not offered by an authoring application then an alternative mechanism for representing shared data within the cloud platform may be encapsulating shared data as attachments or other data objects that may have an icon or thumbnail displayed by platform's client applications, while the original authoring software or other software aware of the full data format may be required to display and edit the data.

For example, the Evernote Food software has been designed for capturing meals, recipes, cooking processes and other food related items. While converting its food notes into Evernote's main format for subsequent synchronization with the Evernote service, the software may allow editing by the main Evernote client software certain data fragments, such as captions, comments and other data entered by a user in the plain text format. At the same time, the software may restrict any data editing that might result in breaking a dedicated layout and visual consistency of the food notes. Similarly, the Evernote Hello personal contact management software may allow editing field values but not field names; the software may also prohibit editing note titles arriving into the Evernote service and other data elements that are built programmatically by combining data from various input fields or are extracted from external sources, such as, for example, Twitter names or LinkedIn pages.

Another scenario of restrictive data editing may include multi-step data creation and/or modification where the first authoring application builds a set of data and converts it into a data format compatible with the next-in-line authoring application, simultaneously imposing certain editing restrictions. The next authoring application, in turn, may allow users editing portions of the received data and convert the data into a subsequent format, adding restrictions depending on the characteristics of the next-in-line application. The process may continue until some authoring application in the chain converts its data into a standard platform format. Under such a scenario, users of the platform's client software may edit the data under cumulative restrictions. Afterwards, the data may be returned unbroken to any of the authoring applications in the chain and made available to additional applications that may join the platform in the future for editing, which may be free of some or all editing restrictions. Sharing the data back to upstream authoring applications may be accompanied by converting data sets to the corresponding rich formats and by removing all or some of the editing restrictions previously imposed by those applications prior to sharing their data downstream.

Restrictions may be available for interpretation by any data editing applications at the execution time and may even be partially accessible by advanced users. For example, application data may be template based and some template elements may be exposed to users via special utilities or authoring application modes to allow designation of elements as editable or non-editable data by all or particular downstream applications.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for introducing and managing editing restrictions on rich application data created by authoring software integrated with a cloud platform. Such data may undergo multiple steps of conversion into other data formats and accumulating editing restrictions. At each step, certain software, including client software of the cloud platform, may allow users to edit only certain portions of the data to keep integrity and rendering consistency of the data. Edited data may be shared back across the software chain.

Figure 1:
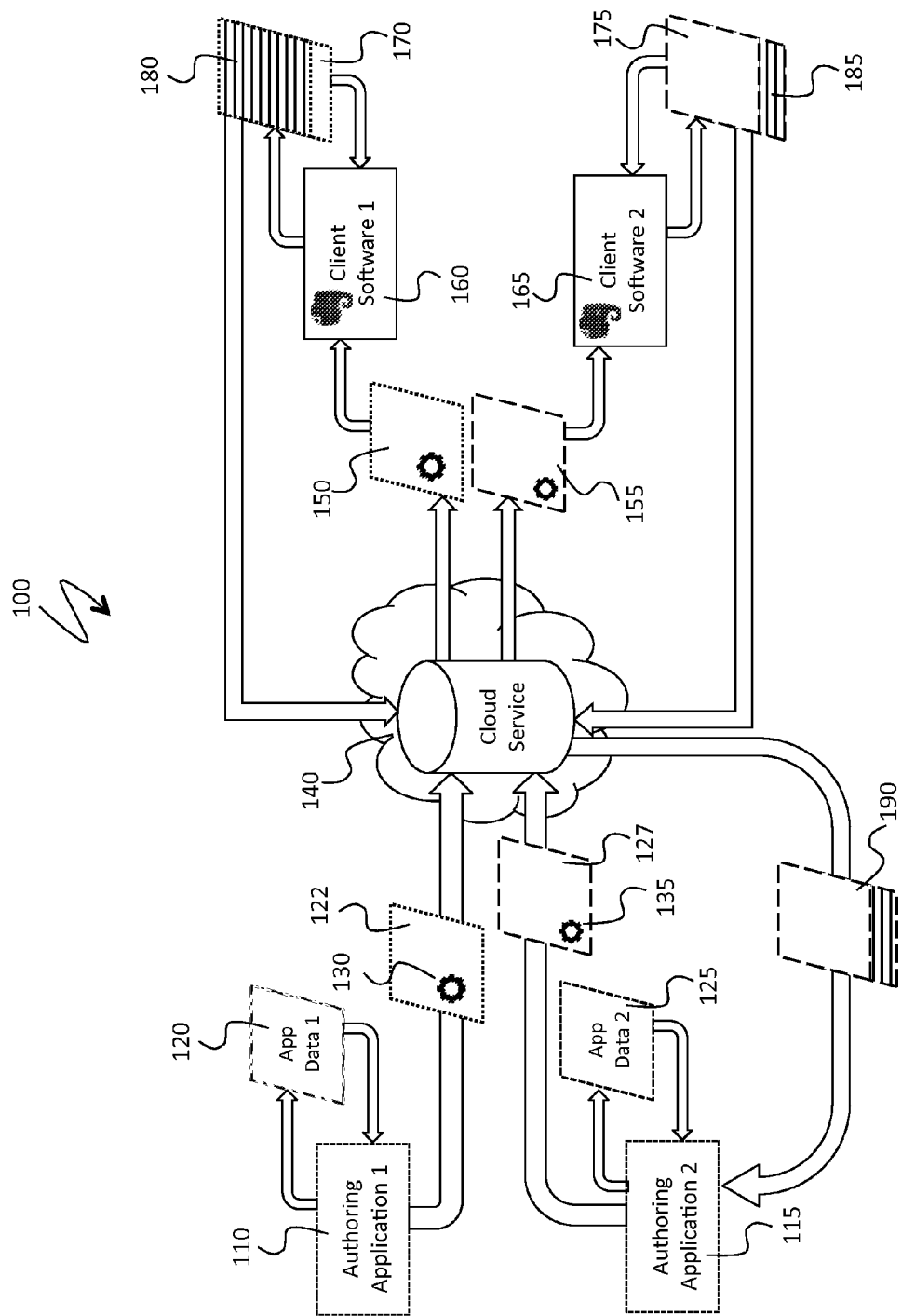
FIG. 1 is a system architecture chart for a scenario with a one-step conversion of custom authoring data into a standard platform format, according to an embodiment of the system described herein.

FIG. 1 is a system architecture chart 100 for a scenario with a one-step conversion of custom authoring data into a standard platform format. Two independent authoring applications 110, 115 create and edit two types of application data 120, 125, respectively. At some phase, the applications 110, 115 share data with a cloud service and platform 140, at which time the application data 120, 125 for the authoring applications 110, 115 is converted into altered data 122, 127 that corresponds to standard formats of the platform, as shown by altered dashing style frames showing the altered data 122, 127. Editing restrictions 130, 135 may be added to the altered data 122, 127 prior to sharing the altered data 122, 127 with the cloud service 140. The service 140 honors the editing restrictions 130, 135 imposed by the authoring applications 110, 115 and transmits the restrictions 130, 135 without changes in new data sets 150, 155 to client software applications 160, 165 of the cloud service 140, which may be desktop or mobile, dedicated or browser based client applications. The client software applications 160, 165 display the data 150, 155 to users who may selectively edit permitted portions 170, 175 of the data 150, 155, leaving untouched restricted portions 180, 185 shown as dashed out on the chart. After editing, the client software applications 160, 165 may share the data back to the cloud service 140, for example, via a synchronization mechanism. The cloud service 140 may share partially edited data 190 back with the original authoring application 115, as shown in the chart 100. Sharing back may be accompanied by conversion of the application data format back to the original application data format of the application 115 and by removing all or some of the editing restrictions imposed by the application 115 prior to sharing its data downstream.

Figure 2:
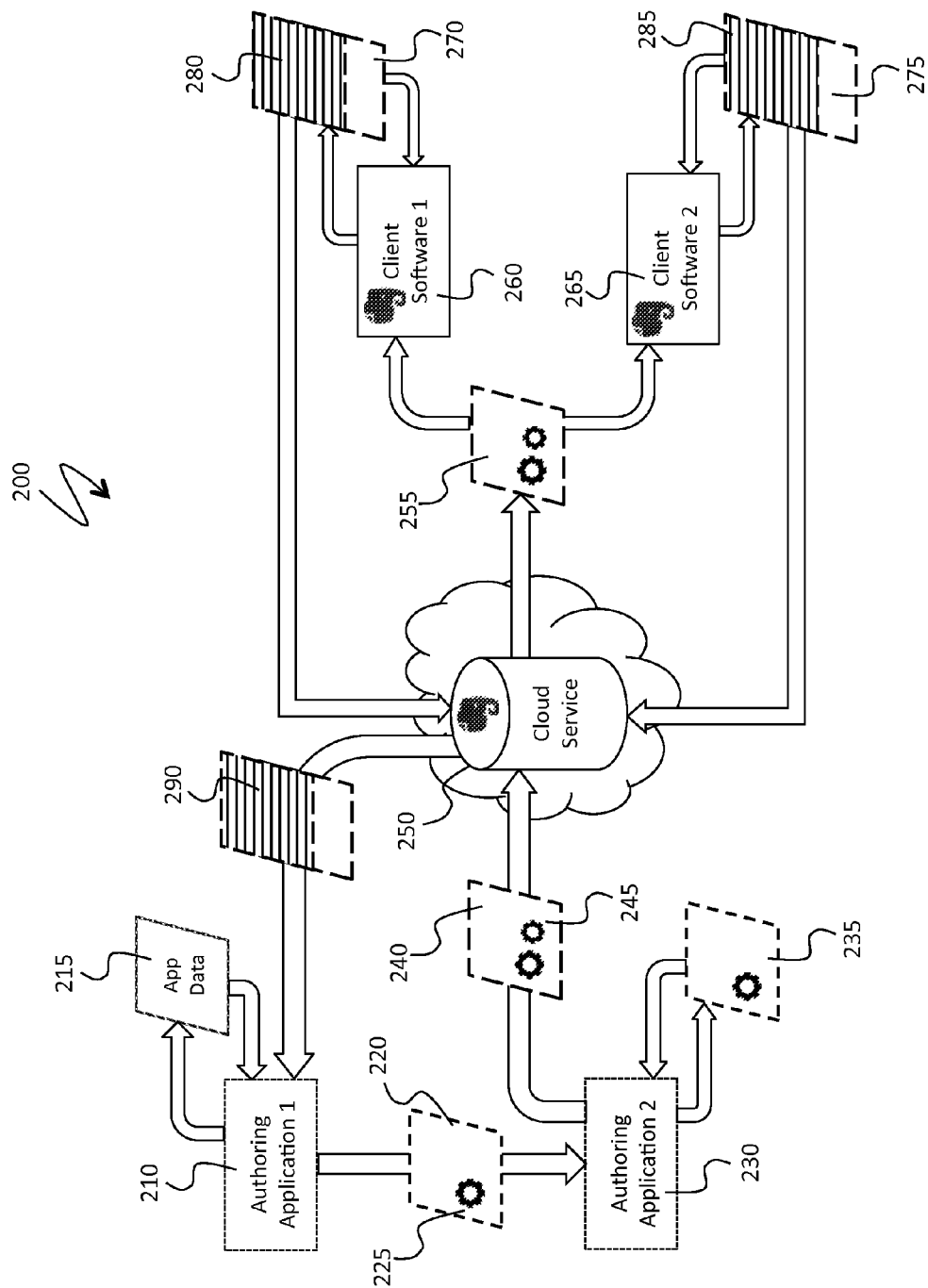
FIG. 2 is a system architecture chart for a scenario with a multi-step conversion of custom authoring data into a standard platform format, according to an embodiment of the system described herein.

FIG. 2 is a system architecture chart 200 for a scenario with a multi-step conversion of custom authoring data into a standard platform format. An authoring application 210 creates and edits an application data set 215. Upon a platform request, the authoring application 210 converts the data 215 into a format compatible with another authoring application 230, creating a dataset 220 and, after an addition of editing restrictions 225, shares data with the other authoring application 230, which, in its turn, may modify the data, as shown by a dataset 235. Eventually, the application 230 may receive a request from the cloud service 250, the central platform component, to share the data, which the application 230 does by creating another dataset 240 with additional conversion and augmented editing restrictions 245. The cloud service 250 receives the data 240, honors the editing restrictions and transmits the data, similar to FIG. 1, to client software applications 260, 265 of the cloud service 250 in an unchanged form 255. Client software applications 260, 265 may edit permitted portions of data, 270, 275 leaving aside restricted portions of data 280 and 285. In contrast with FIG. 1 where the application data and the editing restrictions were created by two different authoring applications 110, 115 and might have been completely different, both the data sets and the subsets of parameters permitted for editing on FIG. 2 are identical, even though editing actions by two different clients 260, 265 may be different and may be subject to consolidation at a service level. Edited data 290 may be returned to the cloud service 250 and may be shared with any or both authoring applications 210, 230 as schematically shown in the chart 200. Sharing the edited data back may be accompanied by conversion of the application data format to the original application data format of the application(s) 210, 230 and by deleting some or all of the editing restrictions imposed by the application(s) 210, 230 prior to sharing its data downstream.

Figure 3:
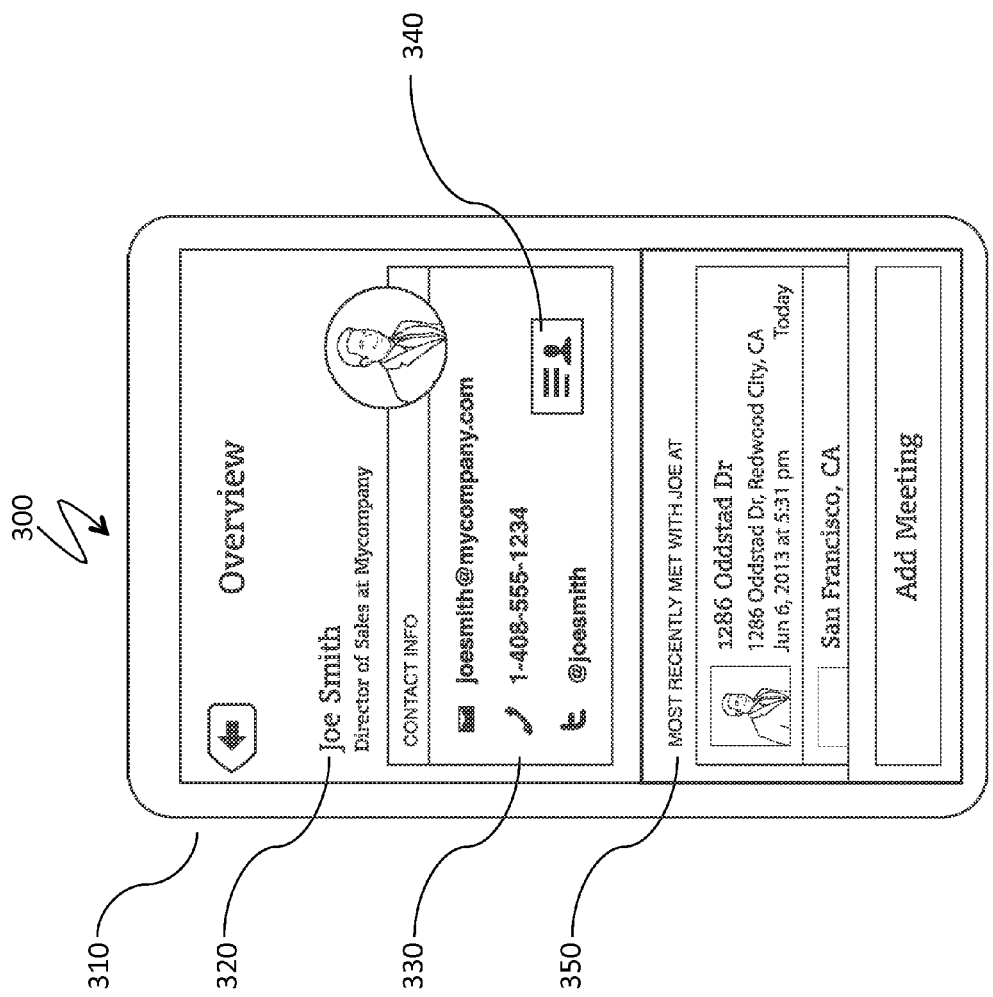
FIG. 3 is a schematic illustration of data representation in an original authoring application, according to an embodiment of the system described herein.

FIG. 3 is a schematic illustration 300 of data representation in an original authoring application. A personal contact management application, such as Evernote Hello, runs on a mobile device 310 and displays a contact summary 320, contact info 330 with further details and editing available via a button 340, and a list 350 of meetings, or encounters, between a contact and an owner of the mobile device.

Figure 4:
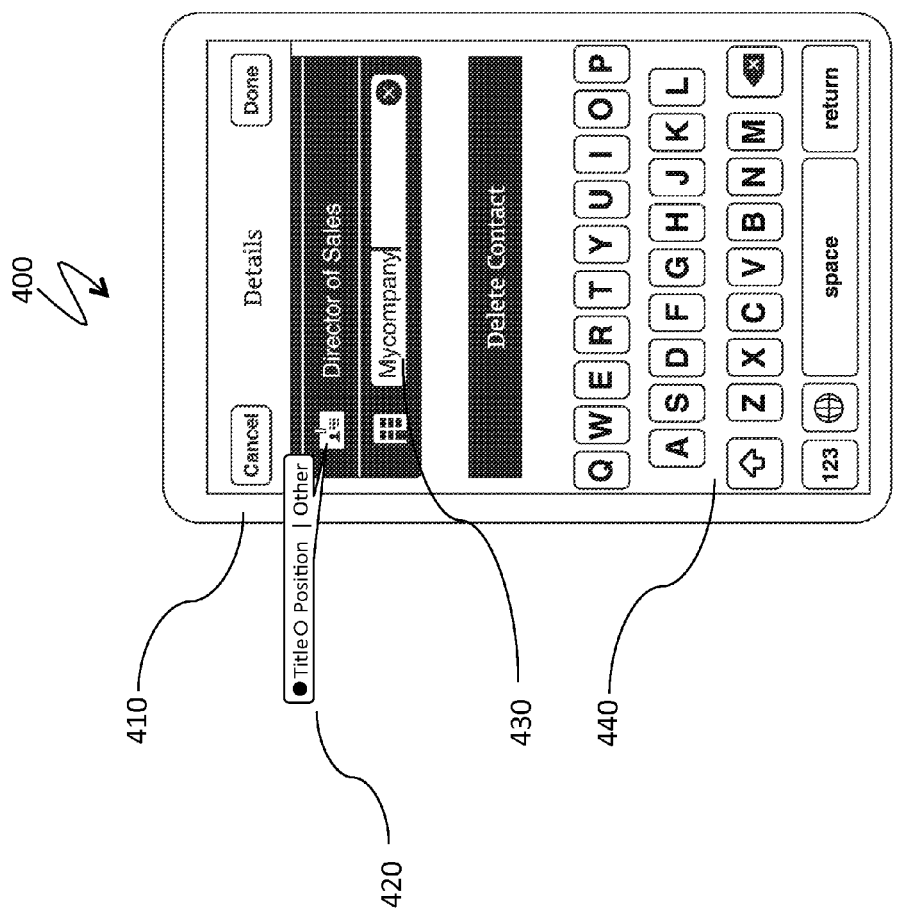
FIG. 4 is a schematic illustration of data editing in an authoring application, according to an embodiment of the system described herein.

FIG. 4 is a schematic illustration 400 of data editing in an authoring application. An application is running on a mobile device 410 and displays a portion of contact details. In the illustration 400, both field names and field values for the contact info may be editable. For example, a name of an affiliation field 420 may be chosen between "Title" and "Position", as indicated by two radio buttons, or may be edited, as shown by the "Other" value. Field value 430 of a contact's organization "Mycompany" may also be edited, as illustrated by a cursor in the field and a ready software keyboard 440.

Figure 5:
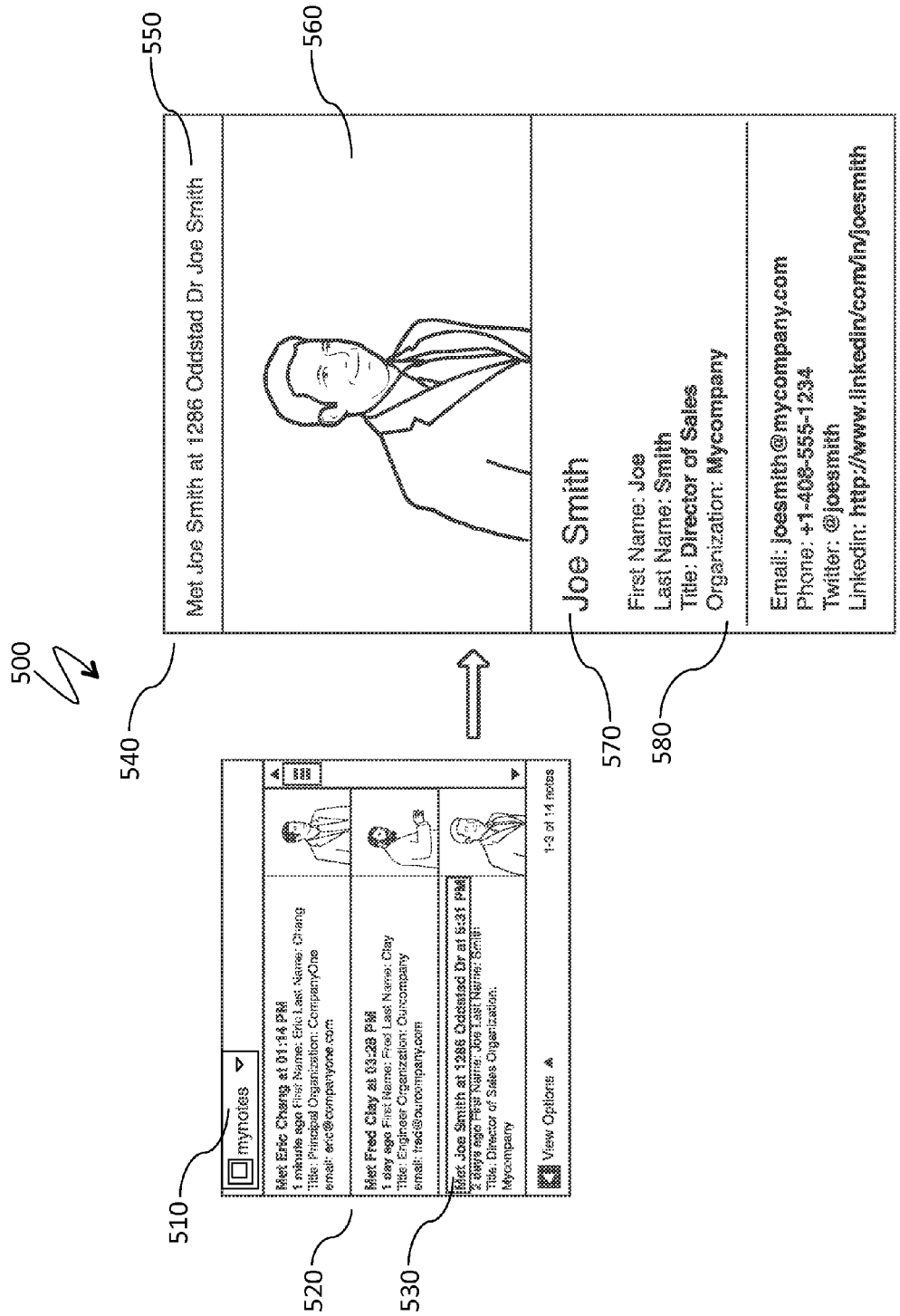
FIG. 5 is a schematic illustration of data converted into a platform format and displayed in client software of a platform, according to an embodiment of the system described herein.

FIG. 5 is a schematic illustration 500 of application data converted into a main platform format and displayed in client software of the platform. In this example, data from a contact management application has been converted into the main platform format of a content management platform and stored in a content collection 510 (such as an Evernote notebook "mynotes"). A variety of contact records 520 are stored in the collection; an item 530, corresponding to the data from FIGS. 3, 4, is selected and opened as a separate item 540 in a client software application of the platform. A note created from a contact entry in an authoring application includes a header 550, a photo 560, a contact summary 570, and contact info 580. While editing values of contact fields, i.e. the actual contact info, may be permissible in the platform client software, modifying field names or programmatically created summaries or headers may break data integrity or user interface consistency when shared between the platform client software and the original authoring application or other integrated applications, and thus may be undesirable. Therefore, restrictions may be applied at a conversion stage, as explained elsewhere herein.

Figure 6:
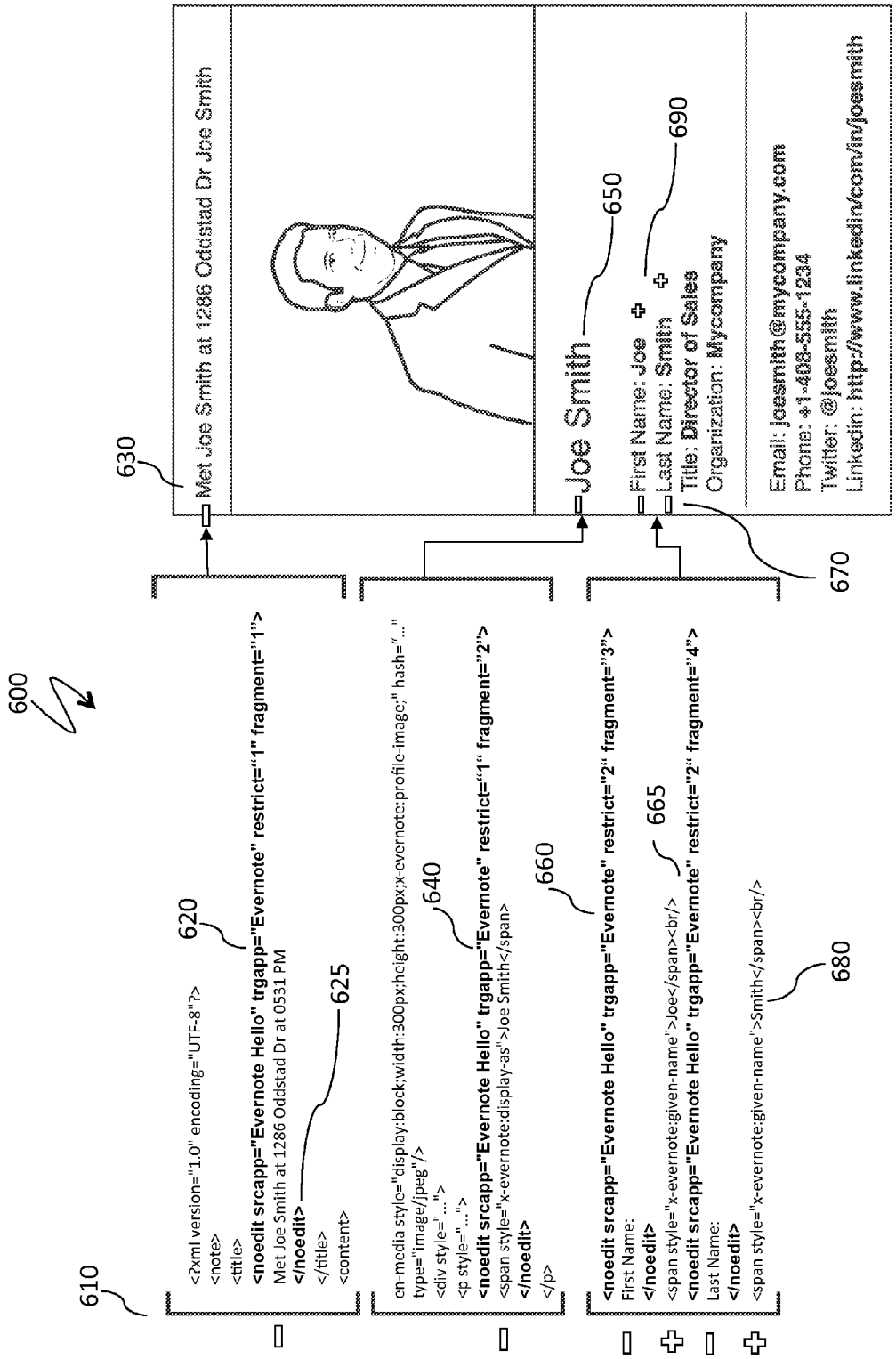
FIG. 6 is a schematic illustration of one-level editing restrictions in application data, according to an embodiment of the system described herein.

FIG. 6 is a schematic illustration 600 of one-level editing restrictions in data added by an original authoring application and honored by a cloud service and client software of the cloud server. Relevant fragments 610 of the application data in XML format are shown on the left side of FIG. 6, while displayed user interface elements to which the restriction apply are shown on the right side of the drawing and replicate the display of contact record in the client software as shown on the previous FIG. 5. By default, any fragments of application data that are exposed to a user and do not include any restrictions are considered editable (other embodiments may have a different convention in this respect). A noedit tag 620 added to the application data by the authoring application prohibits or restricts data editing for a portion of the data starting from the end of an opening statement of the noedit tag 620 and up to a closing statement 625 of the noedit tag 620. The restriction is shown by a minus sign to the left from the fragment and pertains to a note title 630, which is created programmatically from other portions of the application data, so editing the note title 630 is meaningless. An editing restriction tag created by an authoring application may include additional information. Analyzing such information by a target application may result in different options, including partial or complete ignoring of a tag, limiting restriction of a tag to specific categories of users, various user interface actions and messages, etc. (see, for example, FIG. 8 below). In the illustration 600, the noedit tag 620 includes:

- The name of a source authoring application (srcapp="Evernote Hello")
- The name of a target application known to the original authoring application at the time of adding restrictions (trgapp="Evernote")
- A restriction type; for example, restrict="1" may indicate a strict prohibition, as would be reasonable with respect to the compiled note title 630. Alternatively, other values of restriction type, for example, restrict="2", may indicate a non-strict prohibition, inviting, as an example, a warning by the target application, upon acceptance of which a user might be allowed to edit the restricted data
- A serial number of the restricted fragment in the data set.

A next restriction tag 640 blocks from editing a whole contact summary line 650, which, similarly to the note title, is compiled from different contact fields and is created programmatically; therefore, editing the contact summary line 650 is prohibited with the same high priority as in the tag 620.

A next fragment of restrictive editing includes two subsequent tags 660, 665, which limit editing of contact field names 670 (First Name and Last Name), while leaving outside the tags 660, 665 field values 680 (as shown in the data fragment) and hence permitting editing of the field values 690 (Joe and Smith), as indicated by the alternating minus and plus signs in the data fragment and in the note. Here, editing of field names is undesirable because of the application ecosystem logic and a possibility to break user interface consistency. However, such editing is not as dangerous or meaningless as editing the previous data fragments 630 and 650; therefore, the restriction type has been relaxed to restrict="2" and application developers may use the relaxed restriction as an opportunity to offer more flexible approach to editing field names.

In all four examples of FIG. 6, editing restriction tags are plain, non-hierarchical.

Figure 7:
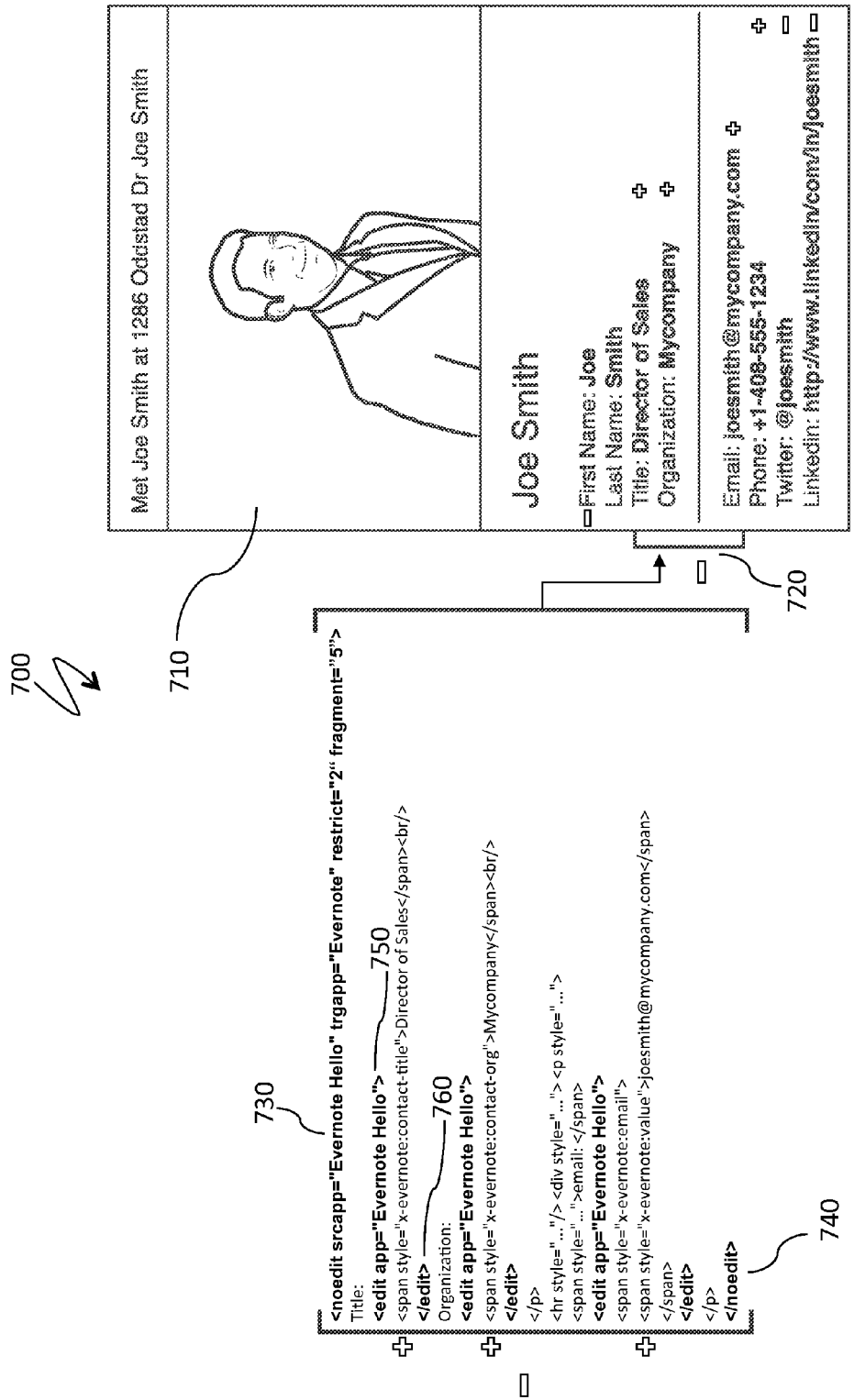
FIG. 7 is a schematic illustration of nested editing restrictions in application data, according to an embodiment of the system described herein.

FIG. 7 is a schematic illustration 700 of nested editing restrictions in application data. The illustration 700 shows processing of a different portion of the same note as on FIGS. 5, 6. Editing restrictions upon three fields 720: Title, Organization, and Email, have the same nature as First Name and Last Name fields on FIG. 6—editing field values is allowed, while editing field name is restricted. However, FIG. 7 illustrates another mechanism for marking up editing restrictions in the text. A restrictive tag 730 and end of restrictive tag 740 blocks out any editing of the fields 720, including field name and values. Afterwards, three nested tags, starting with an opening tag statement 750 and a corresponding closing tag 760, permit editing of certain fragments within the blocked out text. Thus, the editing permission tag 750 and corresponding closing tag 760 allows editing of the contact title, and two subsequent tags (in bold) provide the same for the organization name and email.

The usage of plain and nested tags is a matter of efficiency and readability of editing restrictions in the application data and can be optimized depending on the data structure.

It should also be noted that of the three contact fields remaining at the bottom of FIG. 7, the value of the first field, phone number, should allow editing, while editing of the twitter name and LinkedIn page may be restricted, since they are retrieved by interoperating with the two social sites using basic contact info.

Figure 8:
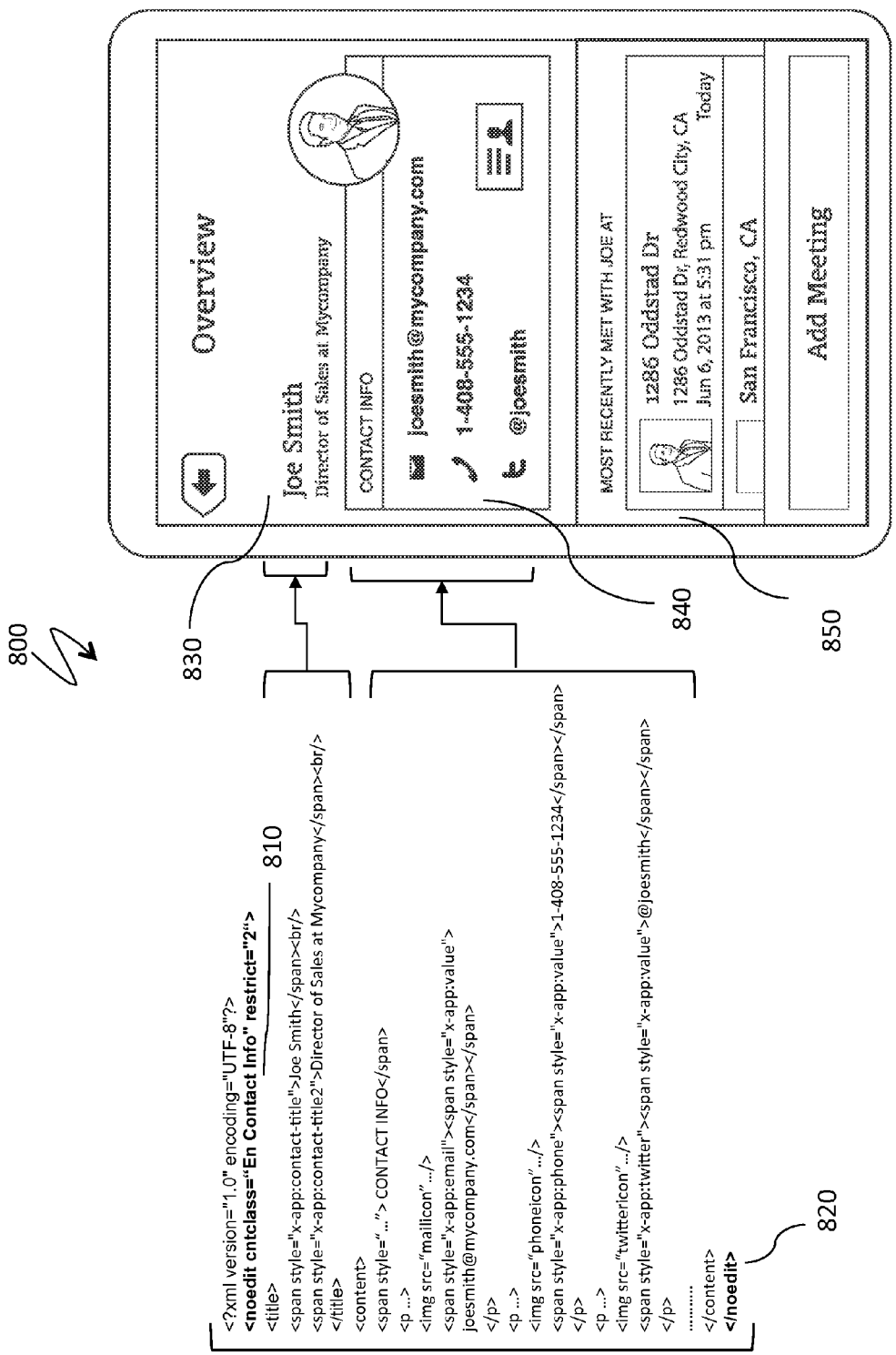
FIG. 8 is a schematic illustration of editing restrictions related to a content class as a whole, according to an embodiment of the system described herein.

FIG. 8 is a schematic illustration 800 of restrictions on data editing presented in the form of a content class. An opening portion of a tag 810 declares content created by a contact application, such as Evernote Hello, a special data type "En Contact Info" (parameter cntclass="En Contact Info"). A portion of content between the opening tag 810 and a corresponding closing tag 820 includes a note title 830, contact info 840 and encounter info 850. Editing data in each of the note title 830, contact info 840, and encounter info 850 may be entrusted only to applications that have a sufficient knowledge about the En Contact Info content class. For example, editing the title portion 810, which is compiled from the contact info is meaningless and would break the logic of data representation in the contact record.

Figure 9:
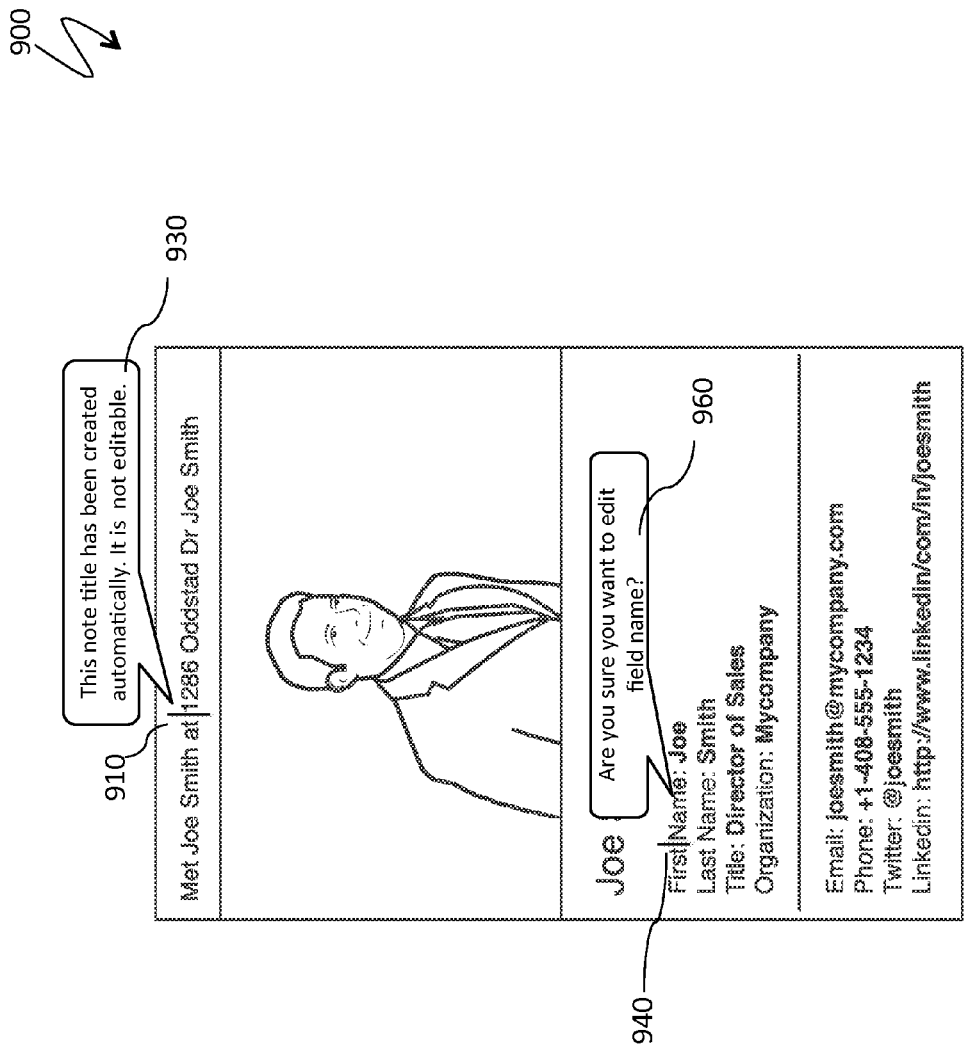
FIG. 9 is a schematic illustration of user interface messages when editing of restricted data is attempted, according to an embodiment of the system described herein.

FIG. 9 is a schematic illustration 900 of user interface messages when editing of restricted data is attempted. The illustration 900 uses the same contact record as in FIGS. 5-7. In a first case, when a user puts a cursor 910 within a note title and attempts editing it, for example, by typing on a keyboard, pressing keyboard keys has no effect and a message 930 instantly pops up warning that the title is not editable. The system may behave differently in the second case when a cursor 940 is placed within a field name and a user attempts editing it by using a keyboard. Since the restriction on field name has a lower priority compared with the first case, the system may display a softer warning 960, asking the user to confirm the intent of editing the field name. Then, depending on implementation specifics, the system may offer subsequent warnings (for example, explaining the risks of editing the field name), check user status (if editing field names is restricted to certain categories of users) or allow instant editing of the field name.

Figure 10:
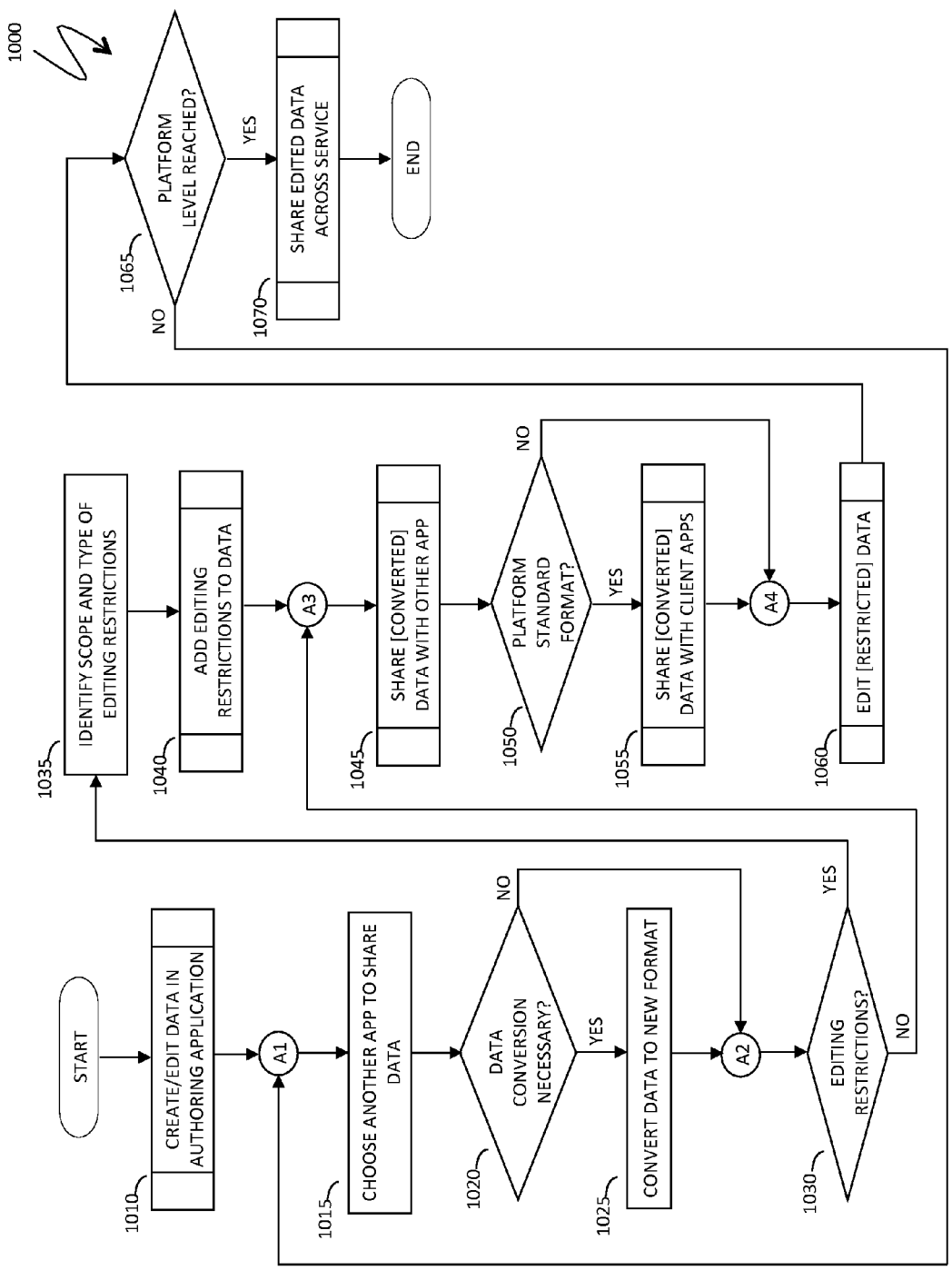
FIG. 10 is a system flow diagram illustrating processing performed in connection with creating and utilizing editing restrictions during data conversion, according to an embodiment of the system described herein.

Referring to FIG. 10, a flow diagram 1000 illustrates processing performed in connection with creating and utilizing editing restrictions during data conversion. Processing starts at a step 1010 where a user creates and/or edits data in an original authoring application, as illustrated, for example, by the items 110, 120, 115, 125, 210, 215, 230, 235 in FIGS. 1 and 2. After the step 1010, processing proceeds to a step 1015, where the system or the user choose another software application to share the created data. Thus, a system choice may be dictated by an integration of the original authoring application into a cloud platform, which may require periodic data synchronization, such as in the case of Evernote Food, Skitch or Hello applications. On the other hand, the user may also select another authoring application to use additional data editing features that may be absent in the original application but compatible with format of the data.

The chosen application may be the platform cloud service with client software (as discussed in conjunction with FIG. 1) or an intermediate authoring application (as discussed in conjunction with FIG. 2). In any event, after the step 1015, processing proceeds to a test step 1020 where it is determined whether a data conversion is necessary to share the application data with the chosen software application. If so, then processing proceeds to a step 1025; otherwise, processing proceeds to a test step 1030. At the step 1025, application data is converted into a new format as required by the chosen application. Following the step 1025, processing proceeds to the test step 1030, which may also be independently reached from the step 1020 if data conversion is not necessary.

At the test step 1030, it is determined whether editing restrictions are applied to the converted data. If so, then processing proceeds to a step 1035; otherwise, processing proceeds to a step 1045. At the step 1035, the scope and type of editing restrictions are analyzed. After the step 1035, processing proceeds to a step 1040 where editing restrictions are added to the application data, as explained elsewhere herein. After the step 1040, processing proceeds to the step 1045, which may also be independently reached from the step 1030 if editing restrictions are not applied. At the step 1045, the data (possible converted if the need for conversion was detected at the test step 1020 and possibly with editing restrictions, subject to the test step 1030) is shared with the chosen software application. After the step 1045, processing proceeds to a test step 1050 where it is determined whether the chosen software application format to which the conversion was performed is a standard (main) platform format. If so, then processing proceeds to a step 1055; otherwise, processing proceeds to a step 1060. At the step 1055, the platform cloud service shares converted (if conversion was required at the step 1020) and restricted for editing (if so determined at the step 1030) with client applications of the platform cloud service making the data available to rendering, display and editing, with possible editing restrictions. For example, the Evernote Service has several dozens of mobile and desktop client applications running natively on the majority of operating systems.

After the step 1055, processing proceeds to the step 1060, which may also be independently reached from the step 1050 if the chosen software application format to which the conversion was performed is not a standard (main) platform format. At the step 1060, users may edit the application data, with optional restrictions imposed at the step 1040. After the step 1060, processing proceeds to a test step 1065 where it is determined whether a chain of data conversions between authoring applications, with the possible accumulation of editing restrictions, has reached the platform level; in other words, it is determined whether the original data has been converted, possibly among other intermediate formats, into the platform standard format. If so then processing proceeds to a step 1070; otherwise, processing proceeds back to the step 1015 where the chain of authoring applications dealing with the original application data is continued. At the step 1070, the cloud service (the central platform component) shares the edited data across the service, including the original authoring application and any other integrated applications that are aware of and can use the type of application data. Following the step 1070, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. Note that the system described herein may work with a desktop, a laptop, a mobile device, such as a cell phone, and/or any other computing device in addition to a mobile device.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of sharing data between applications, comprising:
    a first application converting data from a first format useable by the first application to a second format useable by a second application; and
    the first application providing editing restrictions to restrict the second application from editing at least some of the data in the second format, wherein edited data is provided by the second application back to the first application and wherein, in connection with providing the data back to the first application, the data is converted back to the first format and the editing restrictions are removed.

2. The method, according to claim 1, wherein at least some of the editing restrictions prohibit editing at least some of the data by the second application.

3. The method, according to claim 2, wherein the user receives a notification in connection with attempting to edit at least some of the data indicating that editing is prohibited.

4. The method, according to claim 1, wherein at least some of the restrictions provide a warning to a user of the second application.

5. The method, according to claim 4, wherein the user can choose to edit the restricted data after receiving the warning.

6. The method, according to claim 1, wherein at least one of the restrictions indicates a special format of data that is editable by applications that understand the format.

7. The method, according to claim 1, wherein the editing restrictions are provided as markup text in the data.

8. The method, according to claim 7, wherein the markup text is provided as tags in the data and wherein a first tag indicates a beginning of a particular restricted portion of the data and a second tag indicates an end of the particular restricted portion.

9. The method, according to claim 8, wherein the tags have parameters indicating one or more of: restriction strength, an identifier of an original application, an identifier of an intermediate application, an identifier of a target application, and an identifier of the restriction within a data set.

10. The method, according to claim 7, wherein the markup text can be nested.

11. The method, according to claim 1, wherein the third application is restricted from editing data based on restrictions provided by the first application.

12. The method, according to claim 1, wherein the second application is a cloud data service that provides accessibility and restricted editing of the data to clients that connect to the cloud service.

13. The method, according to claim 12, wherein data at the cloud service is edited by at least one of the clients.

14. A method of sharing data between applications, comprising:
    a first application converting data from a first format useable by the first application to a second format useable by a second application;
    the first application providing editing restrictions to restrict the second application from editing at least some of the data in the second format;
    the second application converting data from the second format to a third format useable by a third application; and
    the second application providing editing restrictions to restrict the third application from editing at least some of the data in the third format, wherein edited data is provided by the third application back to at least one of: the first application and the second application and wherein, in connection with providing the data back to the first application, the data is converted back to the first format and the editing restrictions provided by the first application are removed and wherein, in connection with providing the data back to the second application, the data is converted back to the second format and the editing restrictions provided by the second application are removed.

15. Computer software provided in a non-transitory computer-readable medium, that shares data between applications, the software comprising:
    executable code that converts data from a first format useable by a first application to a second format useable by a second application; and
    executable code that provides editing restrictions to restrict the second application from editing at least some of the data in the second format, wherein edited data is provided by the second application back to the first application and wherein, in connection with providing the data back to the first application, the data is converted back to the first format and the editing restrictions are removed.

16. The Computer software, according to claim 15, wherein at least some of the editing restrictions prohibit editing at least some of the data by the second application.

17. The Computer software, according to claim 16, wherein the user receives a notification in connection with attempting to edit at least some of the data indicating that editing is prohibited.

18. The Computer software, according to claim 15, wherein at least some of the restrictions provide a warning to a user of the second application.

19. The Computer software, according to claim 18, wherein the user can choose to edit the restricted data after receiving the warning.

20. The Computer software, according to claim 15, wherein at least one of the restrictions indicates a special format of data that is editable by applications that understand the format.

21. The Computer software, according to claim 15, wherein the editing restrictions are provided as markup text in the data.

22. The Computer software, according to claim 21, wherein the markup text is provided as tags in the data and wherein a first tag indicates a beginning of a particular restricted portion of the data and a second tag indicates an end of the particular restricted portion.

23. The Computer software, according to claim 22, wherein the tags have parameters indicating one or more of: restriction strength, an identifier of an original application, an identifier of an intermediate application, an identifier of a target application, and an identifier of the restriction within a data set.

24. The Computer software, according to claim 21, wherein the markup text can be nested.

25. The Computer software, according to claim 15, wherein the third application is restricted from editing data based on restrictions provided by the first application.

26. The Computer software, according to claim 15, wherein the second application is a cloud data service that provides accessibility and restricted editing of the data to clients that connect to the cloud service.

27. The Computer software, according to claim 26, wherein data at the cloud service is edited by at least one of the clients.

28. Computer software provided in a non-transitory computer-readable medium, that shares data between applications, the software comprising:
   executable code that converts data from a first format useable by a first application to a second format useable by a second application; and
   executable code that provides editing restrictions to restrict the second application from editing at least some of the data in the second format;
   executable code that converts data from the second format to a third format useable by a third application; and
   executable code that provides editing restrictions to restrict the third application from editing at least some of the data in the third format, wherein edited data is provided by the third application back to at least one of: the first application and the second application and wherein, in connection with providing the data back to the first application, the data is converted back to the first format and the editing restrictions provided by the first application are removed and wherein, in connection with providing the data back to the second application, the data is converted back to the second format and the editing restrictions provided by the second application are removed.

* * * * *